April 10, 1951  L. GOTTFRIED  2,548,601
ANTITIPPING AND BUMPER STRUCTURE FOR BABY CARRIAGES
Filed Oct. 25, 1949
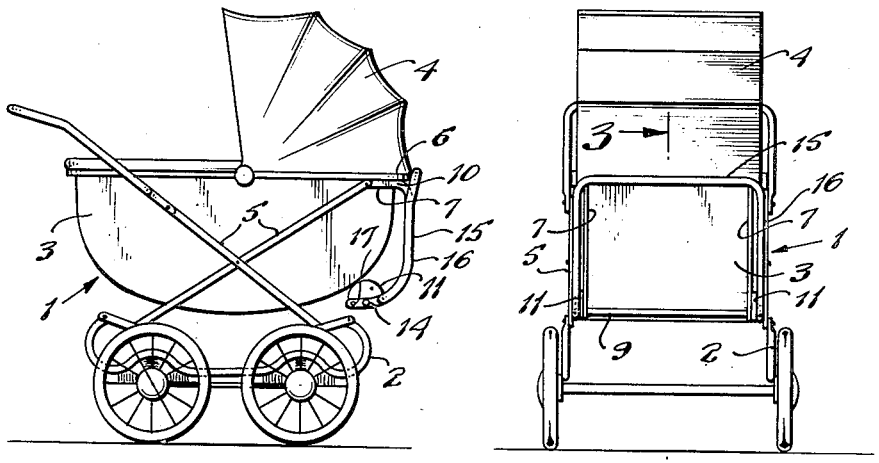
Fig. 1.  Fig. 2.
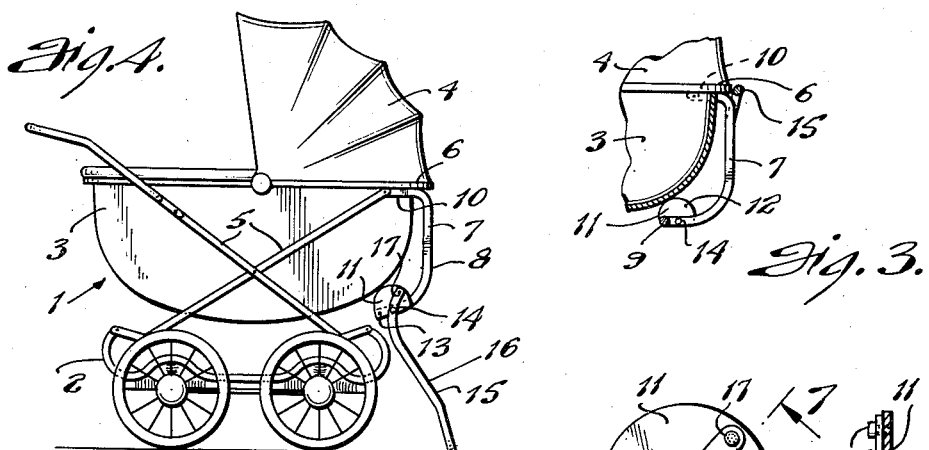
Fig. 4.  Fig. 3.
Fig. 6.  Fig. 7.
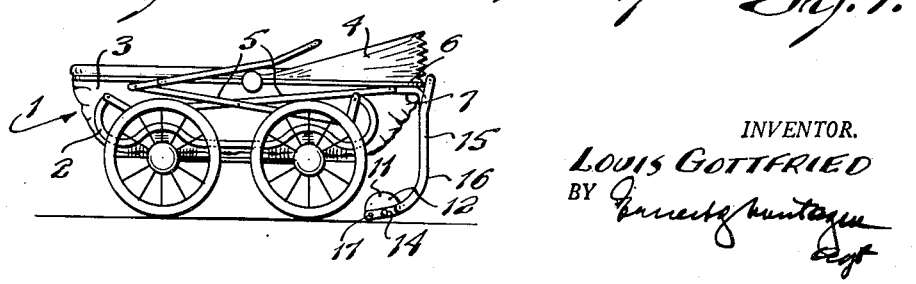
Fig. 5.
INVENTOR.
LOUIS GOTTFRIED
BY Patented Apr. 10, 1951

2,548,601

UNITED STATES PATENT OFFICE 2,548,601

ANTITIPPING AND BUMPER STRUCTURE FOR BABY CARRIAGES

Louis Gottfried, New York, N. Y.

Application October 25, 1949, Serial No. 123,357

10 Claims. (Cl. 280—47)

This invention relates to a baby carriage and in particular to a baby carriage which may be made collapsible.

It has been observed that the rear end of the upper frame of the carriage body is subject to damage when, by wheeling the carriage, the latter abuts against objects and it has been tried to meet this situation by trimming the upper body frame with sheet metal, yet without satisfying results.

It has been found further that the carriage is liable to tip over when the infant moves towards the rear end of the carriage, thereby shifting the center of gravity beyond the critical danger point and bringing about the tipping over of the carriage to its rear.

It is, therefore, one object of the present invention to provide a device disposed at the rear end of the baby carriage which operates as bumper in one position and as anti-tipping member in another position.

It is another object of the present invention to provide a device disposed at the rear end of the baby carriage which operates as bumper in both the upright and collapsed position of the carriage body.

It is still another object of the present invention to provide a device disposed at the rear end of the baby carriage which includes means for retaining the device in at least two operative positions.

It is yet another object of the present invention to provide a bumper at least at one end of a collapsible carriage.

With these and other objects in view which will become apparent in the following detailed description, the present invention will be clearly understood in connection with the accompanying drawing in which:

Figure 1 is a side elevation of a baby carriage with the carriage body in upright position and the device according to the present invention in a position operating as bumper;

Fig. 2 is an end view of the carriage with the said device in the same position as shown in Fig. 1;

Fig. 3 is a fragmentary section along the lines 3—3 of Fig. 2;

Fig. 4 is a side elevation of a baby carriage with the body in upright position and the device according to the present invention in a position operating as an anti-tipping member;

Fig. 5 is a side elevation of a baby carriage, as shown in Fig. 1, with the carriage body in collapsed position and the device operating as bumper;

Fig. 6 is a fragmentary view of the means for securing the device in the respective positions; and Fig. 7 is a section along the lines 7—7 of Fig. 6.

Referring now to the drawing, the baby carriage 1 comprises a running gear 2, a carriage body 3, which is properly supported by the running gear 2, and a hood 4. While the present invention is particularly disclosed with a scissor-frame 5 in connection with a collapsible carriage body, it is to be understood that any other carriage as a non-collapsible coach or the like may be provided, which carriage is equipped with a device which may be disposed in different predetermined positions and depending upon the different positions operates as a bumper or as an anti-tipping member.

In accordance with the present invention the upper frame 6 of the body 3 is equipped at its rear end with a bracket 7 which is preferably of substantially U-shape, the legs 8 of the U being disposed about vertically, the lower ends of the legs 8 being bent towards the body, so that the base 9 of the U is disposed adjacent the body, while the upper ends 10 of the legs are bent in a horizontal direction to be secured to the upper frame.

A preferably semi-circular plate 11 is provided at the lower end of each leg 8 of the bracket 7 and the plate 11 is equipped with two holes 12 and 13, respectively, for a purpose which will be disclosed below.

At about the center of the semi-circular plate 11 is provided a pivot 14 which secures pivotally another U-shaped member 15 to said plate, the member 15 being preferably of tubular metal. The end of each leg 16 of the member 15 is equipped with a spring bolt 17 which is received by the hole 13 when the member 15 is in upright position operating as a bumper, as shown in Figs. 1 and 5 of the drawing, regardless whether the carriage body 3 is in upright or collapsed position, and which is received by the hole 12 when the member 15 is in turned down position operating as an anti-tipping device, as shown in Fig. 4 of the drawing. If the member 15 is in upward position, forming an inverted U, the base of the U is disposed at the level of the upper frame 6 of the carriage body adjacent the rear end thereof operating as a bumper, while if the member 15 is in turned down position the base of the U is just above ground and thus operates as an anti-tipping device.

Thus, as shown in the drawing, the member 15 is operating as a bumper in upright position of the carriage body (Fig. 1) as well as in the collapsed position of the latter (Fig. 5) or as anti-tipping device in inturned downward position (Fig. 4) with the carriage body in upright position. If the carriage body is collapsed the member 15 moves parallel to itself together with the upper frame of the carriage body into the lowered position.

While I have disclosed one embodiment of the invention it is to be understood that this embodiment is given by example only without limiting the scope of the present invention which is to be determined by the objects and the claims.

I claim:

1. In a baby carriage, a propelling handle secured to one end of the carriage, a running gear and a carriage body having an upper frame, a bracket member secured to the rear end of said upper frame disposed in downward direction and at the end of said carriage opposite said propelling handle, and terminating on each side of said carriage body, a U-shaped member pivotally secured to the lower ends of said bracket member, the base of said U-shaped member being disposed at the level of and adjacent to the rear end of the upper frame of said carriage body in one operative position when operating as a bumper and adjacent the ground in another operative position when operating as anti-tipping device, and means for retaining said U-shaped member in the said two operative positions.

2. In a baby carriage a propelling handle secured to one end of the carriage, a running gear and a carriage body having an upper frame, a bracket member secured to the rear end of said upper frame and disposed along each side of said carriage body in downward direction, and at the end of said carriage opposite said propelling handle, a U-shaped member pivotally secured to the lower ends of said bracket member, the base of said U-shaped member being disposed at the level of and adjacent to the rear end of the upper frame of said carriage body in one operative position when operating as a bumper and adjacent the ground in another operative position when operating as anti-tipping device, and means for retaining said U-shaped member in the said two operative positions.

3. In a baby carriage, a propelling handle secured to one end of the carriage, a running gear and a carriage body having an upper frame, a bracket member secured to the rear end of said upper frame, disposed in downward direction and at the end of said carriage opposite said propelling handle, and terminating on each side of said carriage body, means for collapsing said carriage body, a U-shaped member pivotally secured to the lower ends of said bracket member, the base of said U-shaped member being disposed at the level of and adjacent to the rear end of the upper frame of said carriage body in the upright and collapsed position of the latter in one operative position of said U-shaped member when operating as a bumper and adjacent the ground in the upright position of the carriage body in another position of said U-shaped member when operating as anti-tipping device, and means for retaining said U-shaped member in the said two operative positions.

4. In a baby carriage, a propelling handle secured to one end of the carriage, a running gear and a carriage body having an upper frame, a bracket member secured to the said upper frame disposed in downward direction, and at the end of said carriage opposite said propelling handle, a substantially U-shaped member pivotally secured to the lower ends of said bracket member, the base of said substantially U-shaped member being disposed adjacent to the rear end of said carriage body in one operative position when operating as a bumper and adjacent the ground in another operative position when operating as anti-tipping device, and means for retaining said U-shaped member in the said two operative positions.

5. In a baby carriage, a propelling handle secured to one end of the carriage, a running gear and a carriage body having an upper frame, a bracket member secured to the said upper frame and disposed along each side of said carriage body in downward direction, and at the end of said carriage opposite said propelling handle, a substantially U-shaped member pivotally secured to the lower ends of said bracket member, the base of said substantially U-shaped member being disposed adjacent said carriage body in one operative position when operating as a bumper and adjacent the ground in another operative position when operating as anti-tipping device, and means for retaining said U-shaped member in the said two operative positions.

6. In a baby carriage, a propelling handle secured to one end of the carriage, a running gear and a carriage body having an upper frame, a bracket member secured to the said upper frame, disposed in downward direction, and at the end of said carriage opposite said propelling handle, means for collapsing said carriage body, a substantially U-shaped member pivotally secured to the lower ends of said bracket member, the base of said substantially U-shaped member being disposed adjacent to the rear end of said carriage body in the upright and collapsed position of the latter in one operative position of said U-shaped member when operating as a bumper and adjacent the ground in the upright position of the carriage body in another operative position of said U-shaped member when operating as anti-tipping device, and means for retaining said U-shaped member in the said two operative positions.

7. In a baby carriage, a propelling handle secured to one end of the carriage, a running gear and a carriage body having an upper frame, a bracket member secured to the rear end of said upper frame disposed in downward direction and at the end of said carriage opposite said propelling handle, and terminating on each side of said carriage body, a substantially U-shaped member pivotally secured to the lower ends of said bracket member, the base of said U-shaped member being disposed at the level of and adjacent to the rear end of the upper frame of said carriage body in one operative position when operating as a bumper and adjacent the ground in another operative position when operating as anti-tipping device, and means for retaining said U-shaped member in the said two operative positions, said retaining means comprising a plate member secured to the lower end of said bracket member, said plate having two holes in predetermined positions and the legs of the said U-shaped member extending beyond said pivot of the bracket member, and a spring bolt provided at the end of the leg of said U-shaped member to be received by either one of said holes of the plate member depending upon the upright or turned position of said U-shaped member, thereby retaining the latter in the respective operative positions.

8. In a baby carriage, a propelling handle secured to one end of the carriage, a running gear and a carriage body having an upper frame, a bracket member secured to the said upper frame disposed in downward direction, and at the end of said carriage opposite said propelling handle, a substantially U-shaped member pivotally secured to the lower ends of said bracket member, the base of said U-shaped member being disposed adjacent to the rear end of said carriage body in one operative position when operating as a bumper and adjacent the ground in another operative position when operating as anti-tipping device, and means for retaining said U-shaped member in the said two operative positions, said retaining means comprising a plate member secured to the lower end of said bracket member, said plate having two holes in predetermined positions, and a spring bolt provided on the leg of said U-shaped member to be received by either one of said holes of the plate member depending upon the upright or turned position of said U-shaped member, thereby retaining the latter in the respective operative positions.

9. In a baby carriage, a propelling handle secured to one end of the carriage, a running gear and a carriage body having an upper frame, two bracket members disposed oppositely at each side of the carriage body, and at the end of said carriage opposite said propelling handle, a substantially U-shaped member, a pivot carried by each of said bracket members and disposed at a level which is one-half of the distance between the base of the U-shaped member and the ground and adapted to secure pivotally said U-shaped member, the base of the latter being disposed at the level of and adjacent to the rear end of the upper frame of said carriage body in one operative position when operating as a bumper and adjacent the ground in another operative position when operating as anti-tipping device, and means for retaining said U-shaped member in the said two operative positions.

10. In a baby carriage, a propelling handle secured to one end of the carriage, a running gear and a carriage body having an upper frame, two bracket members disposed oppositely each other on the carriage body, and at the end of said carriage opposite said propelling handle, a substantially U-shaped member, a pivot carried by each of said bracket members and disposed at a level which is one-half of the distance between the base of the U-shaped member and the ground and adapted to secure pivotally said U-shaped member, the base of the latter being disposed adjacent to the said carriage body in one operative position when operating as a bumper and adjacent the ground in another operative position when operating as anti-tipping device, and means for retaining said U-shaped member in the said two operative positions.

LOUIS GOTTFRIED.

REFERENCES CITED

The following references are of record in the file of this patent:

UNITED STATES PATENTS

| Number | Name | Date |
|---|---|---|
| 1,933,537 | Bjorson et al. | Nov. 7, 1933 |

FOREIGN PATENTS

| Number | Country | Date |
|---|---|---|
| 265,034 | Great Britain | Feb. 3, 1927 |